(12) United States Patent
Tsuruya (10) Patent No.: US 7,187,564 B2
(45) Date of Patent: Mar. 6, 2007

(54) SWITCHING POWER SUPPLY UNIT (75) Inventor: Mamoru Tsuruya, Niiza (JP)

(73) Assignee: Sanken Electric Co., Ltd. (JP)

(*) Notice: Subject to any disclaimer, the term of this patent is extended or adjusted under 35 U.S.C. 154(b) by 0 days.

(21) Appl. No.: 10/555,256

(22) PCT Filed: Feb. 21, 2005

(86) PCT No.: PCT/JP2005/002720

§ 371 (c)(1),
(2), (4) Date: Nov. 1, 2005

(87) PCT Pub. No.: WO2005/093935

PCT Pub. Date: Oct. 6, 2005

(65) Prior Publication Data

US 2006/0209582 A1 Sep. 21, 2006

(30) Foreign Application Priority Data

Mar. 26, 2004 (JP) ............................ 2004-092689

(51) Int. Cl.
H02M 3/335 (2006.01)

(52) U.S. Cl. ................................ 363/21.04; 363/56.11; 363/40

(58) Field of Classification Search ............ 363/21.04, 363/21.09, 56.11, 40
See application file for complete search history.

(56) References Cited

U.S. PATENT DOCUMENTS 6,320,765 B2 * 11/2001 Yasumura ................ 363/21.02
6,366,476 B1 * 4/2002 Yasumura ................ 363/21.02
6,466,462 B2 * 10/2002 Nishiyama et al. ....... 363/21.11
6,856,522 B1 * 2/2005 Wittenbreder, Jr. ...... 363/21.01

FOREIGN PATENT DOCUMENTS

| JP | 08-181023 | 7/1996 |
|----|-----------|--------|
| JP | 11-98831 | 4/1999 |
| JP | 11-186076 | 7/1999 |
| JP | 2001-230133 | 8/2001 |
| JP | 2002-199719 | 7/2002 |
| JP | 2004-48965 | 2/2004 |

* cited by examiner

Primary Examiner—Shawn Riley
(74) Attorney, Agent, or Firm—Kilpatrick Stockton LLP (57) ABSTRACT

A switching power source apparatus has a series circuit connected to both ends of a DC power source Vdc1 and having a reactor L3, a primary winding 5a of a transformer T, and a switch Q1, a series circuit connected to both ends of the primary winding and having an auxiliary switch Q2 and a clamp capacitor C3, a saturable reactor SL1 connected in parallel with the primary winding, a rectifying-smoothing circuit D1, D2, L1, C4 for rectifying and smoothing a voltage generated on a secondary winding 5b, and a control circuit 10 for alternately turning on/off the switches Q1 and Q2 and turning off the switch Q2 if a current of the switch Q2 increases due to saturation of the saturable reactor SL1. The reactor L3 is made of leakage inductance between the primary and secondary windings. In the transformer T, the primary winding is divided into two sections that are connected in series, the secondary winding is arranged between the two sections of the primary winding, and the numbers of turns of the two sections of the primary winding are adjusted to adjust the leakage inductance to saturate the saturable reactor SL1.

12 Claims, 9 Drawing Sheets

FIG.1

PRIOR ART

SWITCHING POWER SUPPLY UNIT

TECHNICAL FIELD

The present invention relates to a high-efficiency, small-size, low-noise switching power source apparatus.

BACKGROUND ART

A transformer used for a switching power source apparatus such as an inverter and a DC-DC converter is disclosed in, for example, Japanese Unexamined Patent Application Publication No. H8-181023 (FIG. 1).

Figure 1:
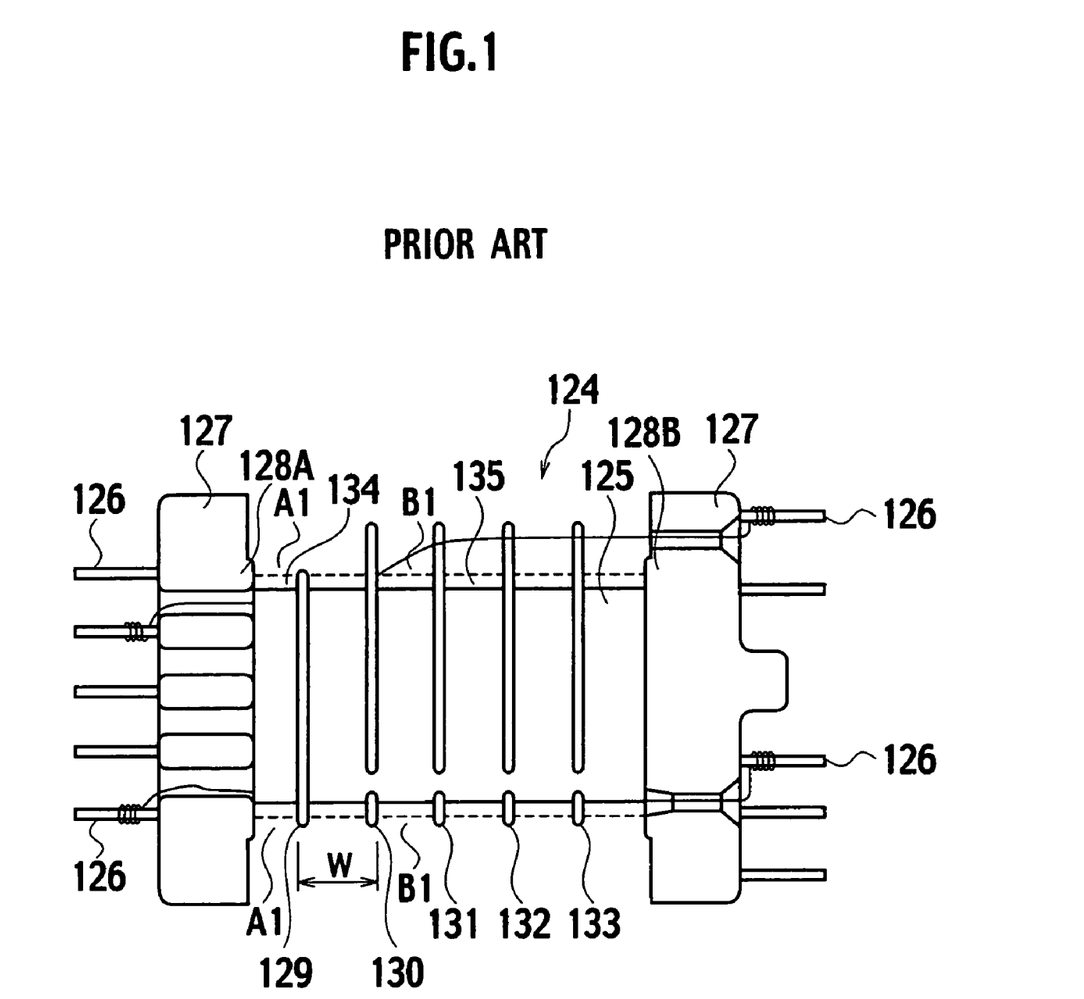
FIG. 1 is a view showing an example of an inverter transformer for a switching power source apparatus according to a related art.

The transformer according to the related art shown in FIG. 1 has a coil bobbin 124 around which primary and secondary windings 134 and 135 are wound. At each end of a body 125 of the coil bobbin 124, there are outer flanges 128A and 128B each having a thick part 127. Between the outer flanges 128A and 128B, intermediate flanges 129, 130, 131, 132, and 133 are formed at predetermined intervals. Between the outer flange 128A and the first intermediate flange 129 adjacent to the outer flange 128A, the primary winding 134 is wound. Between the flange 130 that is spaced from the first intermediate flange 129 by a predetermined distance and the other outer flange 128B, the secondary winding 135 is wound. The secondary winding 135 is divided into a plurality of sections and is spaced from the primary winding 134 by the predetermined distance.

In the transformer having the above-mentioned structure, the primary winding 134 is wound between the outer flange 128A and the first intermediate flange 129. Away from this position by the predetermined distance, the secondary winding 135 is divided into a plurality of sections that are wound between the flanges 130–133. The primary winding 134 is intentionally spaced away from the secondary winding 135, to change the quantity of leakage inductance and capacitance between the primary and secondary windings and optimize a power factor.

DISCLOSURE OF THE INVENTION

However, according to the transformer of FIG. 1, the primary winding 134 and secondary winding 135 are separated from each other by the predetermined distance W and the secondary winding is divided into a plurality (four) of sections, to elongate an axial length, increase the size of the transformer, and push up the cost.

Since the primary and secondary windings are separated from each other by the predetermined distance W, it is impossible to adjust leakage inductance between the primary and secondary windings to a proper value. There is a need of a switching power source apparatus that employs the leakage inductance between the primary and secondary windings of a transformer as a reactor.

According to the present invention, a high-efficiency, low-noise, inexpensive switching power source apparatus being capable of optimizing leakage inductance between the primary and secondary windings of a transformer, thereby eliminating the need of an external reactor, can be provided.

A first technical aspect of the present invention provides a switching power source apparatus comprising a first series circuit connected to both ends of a DC power source and having a first reactor, a primary winding of a transformer, and a main switch that are connected in series, a second series circuit connected to both ends of the main switch or both ends of the primary winding and having an auxiliary switch and a clamp capacitor that are connected in series, a saturable reactor connected in parallel with the primary winding of the transformer, a rectifying-smoothing circuit configured to rectify and smooth a voltage generated on a secondary winding of the transformer, and a control circuit configured to alternately turn on/off the main and auxiliary switches and turn off the auxiliary switch if a current of the auxiliary switch increases due to saturation of the saturable reactor. The first reactor is made of leakage inductance between the primary and secondary windings of the transformer. In the transformer, the primary winding is divided into two sections that are connected in series, the secondary winding is arranged between the two sections of the primary winding, and the numbers of turns of the two sections of the primary winding are adjusted to adjust the leakage inductance between the primary and secondary windings of the transformer.

For the switching power source apparatus of the first technical aspect, a second technical aspect of the present invention forms the saturable reactor with the use of the saturation characteristic of a core of the transformer.

For the switching power source apparatus of the first or second technical aspect, a third technical aspect of the present invention partly reduces the cross-sectional area of a magnetic path of the core of the transformer so that this part of the magnetic path of the core of the transformer is saturated with energy accumulated in the leakage inductance between the primary and secondary windings of the transformer, to thereby make the main switch conduct a zero-voltage switching operation.

For the switching power source apparatus of any one of the first to third technical aspects, a fourth technical aspect of the present invention makes the control circuit turn on the main switch within a predetermined period after the voltage of the main switch is zeroed due to resonance between a capacitor connected in parallel with the main switch and saturated inductance of the saturable reactor.

For the switching power source apparatus of any one of the first to fourth technical aspects, a fifth technical aspect of the present invention forms the rectifying-smoothing circuit with a first rectifying element connected in series with the secondary winding of the transformer, a second rectifying element connected in parallel with the series circuit composed of the first rectifying element and secondary winding, and a smoothing element connected in parallel with the second rectifying element through a second reactor.

For the switching power source apparatus of any one of the first to fourth technical aspects, a sixth technical aspect of the present invention forms the rectifying-smoothing circuit with a third series circuit consisting of the secondary winding and a tertiary winding of the transformer, a fourth series circuit connected to both ends of the third series circuit and having a first rectifying element and a smoothing element, and a second rectifying element connected to a node between the secondary and tertiary windings and a node between the first rectifying element and the smoothing element.

For the switching power source apparatus of the sixth technical aspect, a seventh technical aspect of the present invention winds the primary and secondary windings around the core of the transformer to provide leakage inductance and winds the primary and tertiary windings of the transformer to provide leakage inductance that is smaller than that provided by the primary and secondary windings.

BRIEF DESCRIPTION OF THE DRAWINGS

FIG. 6 is a timing chart showing the details of the signals at the various parts of the switching power source apparatus of the first embodiment when a switch Q1 is turned on;

BEST MODES FOR ACHIEVING THE INVENTION

Switching power source apparatuses according to the embodiments of the present invention will be explained in detail with reference to the drawings.

First Embodiment

According to the switching power source apparatus of the first embodiment, a main switch is turned on to directly supply power to a load from a secondary winding of a transformer. When the main switch is turned off, excitation energy accumulated in a primary winding of the transformer is transferred to a clamp capacitor to be stored therein. An auxiliary switch is turned on so that the transformer operates in the first and third quadrants of a B-H relationship of a core of the transformer and a shortage of excitation energy is supplemented by a reactor connected to the primary winding so that the initial state on the B-H curve is settled at a lower end of the third quadrant. A saturable reactor is connected in parallel with the primary winding of the transformer and is saturated just before the end of an ON period of the auxiliary switch, to increase a current flown therethrough. This results in generating a steep reverse voltage when the auxiliary switch is turned off and making the main switch conduct a zero-voltage switching operation (ZVS operation).

The switching power source apparatus of the first embodiment employs an active clamp, uses energy of leakage inductance between the primary and secondary windings of the transformer to saturate the saturable reactor, and exploits resonance. The primary winding of the transformer is divided into two sections that are connected in series. The secondary winding is arranged between the two sections of the primary winding. The numbers of turns of the two sections of the primary winding are adjusted to optimize the leakage inductance between the primary and secondary windings of the transformer and saturate the saturable reactor wherein the sum of the numbers of turns of the two sections is kept constant. Thus an external reactor is not necessary, capacitance between the primary and secondary windings is reduced, efficiency is improved, noise is reduced, and the cost becomes low.

Figure 2:
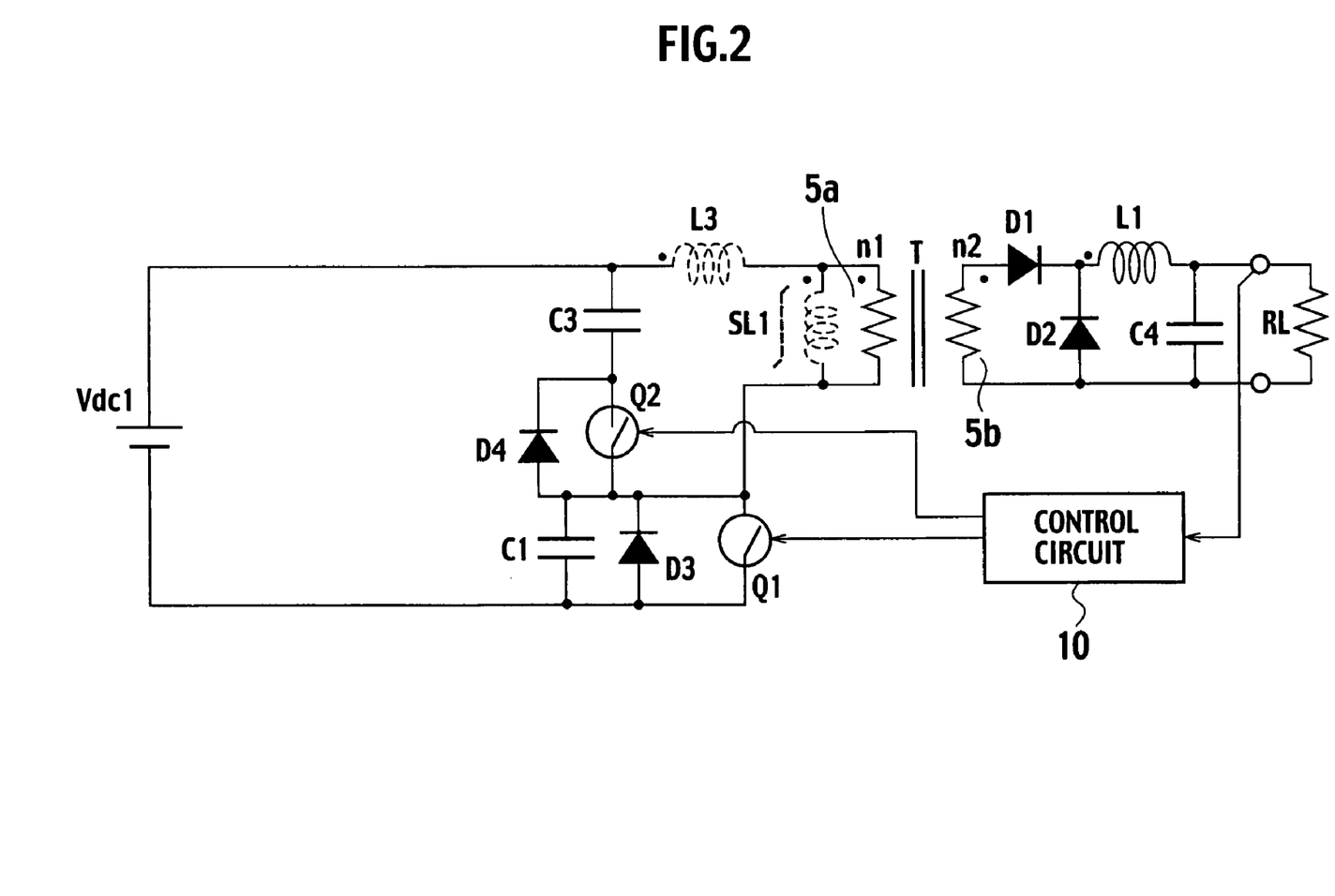
FIG. 2 is a circuit diagram showing a switching power source apparatus according to a first embodiment.

FIG. 2 is a circuit diagram showing the switching power source apparatus according to the first embodiment. In the switching power source apparatus of FIG. 2, both ends of a DC power source Vdc1 are connected to a series circuit having a reactor L3, a primary winding 5a (having the number of turns of n1) of a transformer T, and a MOSFET (field effect transistor) as a switch Q1 (main switch). Both ends of the switch Q1 are connected in parallel with a diode D3 and a capacitor C1. The capacitor C1 and diode D3 may be a parasitic diode and a parasitic capacitor of the switch Q1.

The reactor L3 is leakage inductance between the primary winding 5a and a secondary winding 5b of the transformer T and is depicted with a dotted line. The reactor L3 accumulates energy when the switch Q1 is in a state of ON and supplies the accumulated energy to a clamp capacitor C3 when the switch Q1 is in a state of OFF.

A node between a first end of the primary winding 5a of the transformer T and a first end of the switch Q1 is connected to a first end of a MOSFET as a switch Q2 (auxiliary switch). A second end of the switch Q2 is connected through the clamp capacitor C3 to a positive electrode of the DC power source Vdc1. The second end of the switch Q2 may be connected through the clamp capacitor C3 to a negative electrode of the DC power source Vdc1.

Both ends of the switch Q2 are connected in parallel with a diode D4. The diode D4 may be a parasitic diode of the switch Q2. The switches Q1 and Q2 have a period of time (dead time) in which both of them are in the state of OFF. The switches Q1 and Q2 are alternately turned on/off under PWM control by a control circuit 10.

Both ends of the primary winding 5a of the transformer T are connected to a saturable reactor SL1 that is realized with the saturation characteristic of a core of the transformer T and is depicted with a dotted line. The saturable reactor SL1 receives energy that is biased by energy accumulated in the leakage inductance (reactor L3), and therefore, is applied with a voltage that biases magnetic flux in the third quadrant of a B-H relationship shown in FIG. 7.

Figure 7:
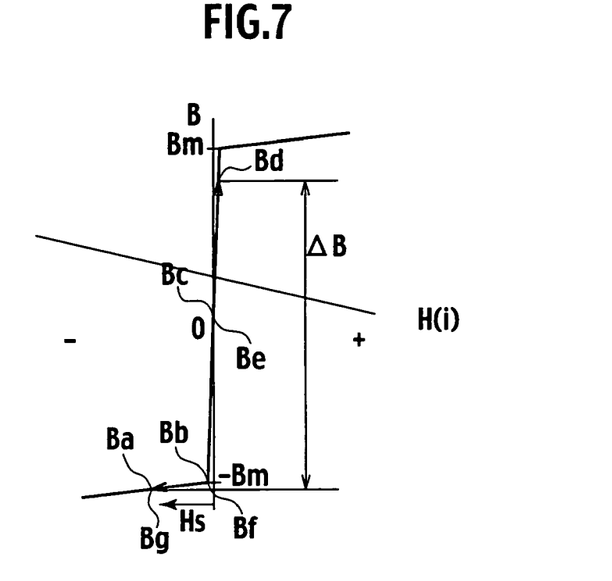
FIG. 7 is a graph showing a B-H curve of the transformer arranged in the switching power source apparatus of the first embodiment.

In FIG. 7, magnetic flux B saturates at Bm as a response to a given positive magnetic field H and also saturates at −Bm as a response to a given negative magnetic field. It is noted that B is a magnetic flux density, and magnetic flux $\phi$ is expressed as $\phi = B \cdot S$ wherein S is a cross-sectional area of the core and S=1 (unit area) in the embodiment, and therefore, $\phi = B$. The magnetic field H is proportional to the magnitude of a current i.

The magnetic flux B of the saturable reactor SL1 moves along the B-H curve in order of representative points Ba, Bb, Bc, Bd, Be, Bf, and Bg. The operational range of the magnetic flux is wide. On the B-H curve, an interval between Ba and Bb and an interval between Bf and Bg each correspond to a saturated state.

In the saturated state, a current of the switch Q2 increases. The switch Q2 is turned off under that state and the voltage thereof decreases to reach zero voltage.

The core of the transformer T is wound with the primary winding 5a and secondary winding 5b (having the number of turns of n2) that are in-phase. A first end of the secondary winding 5b is connected to a diode D1. A node between the diode D1 and a first end of a reactor L1 and a second end of the secondary winding 5b are connected to a diode D2. The diodes D1 and D2 form a rectifying circuit. A second end of the reactor L1 and the second end of the secondary winding 5b are connected to a smoothing capacitor C4. The smoothing capacitor C4 smoothes a voltage of the reactor L1 and supplies a DC output to a load RL.

The control circuit 10 alternately turns on/off the switches Q1 and Q2. If an output voltage of the load RL exceeds a reference voltage, the control circuit 10 narrows the ON-width of a pulse applied to the switch Q1 and widens the ON-width of a pulse applied to the switch Q2. Namely, if an output voltage of the load RL becomes greater than the reference voltage, the control circuit 10 narrows the ON-width of a pulse to the switch Q1 to maintain the output voltage at a constant value.

When a current Q2$i$ of the switch Q2 increases, the control circuit 10 turns off the switch Q2 and then turns on the switch Q1. The control circuit 10 turns on the switch Q1 within a predetermined period after the voltage of the switch Q1 is zeroed due to resonance between the capacitor C1 connected in parallel with the switch Q1 and the saturated inductance of the saturable reactor SL1.

Figure 3:
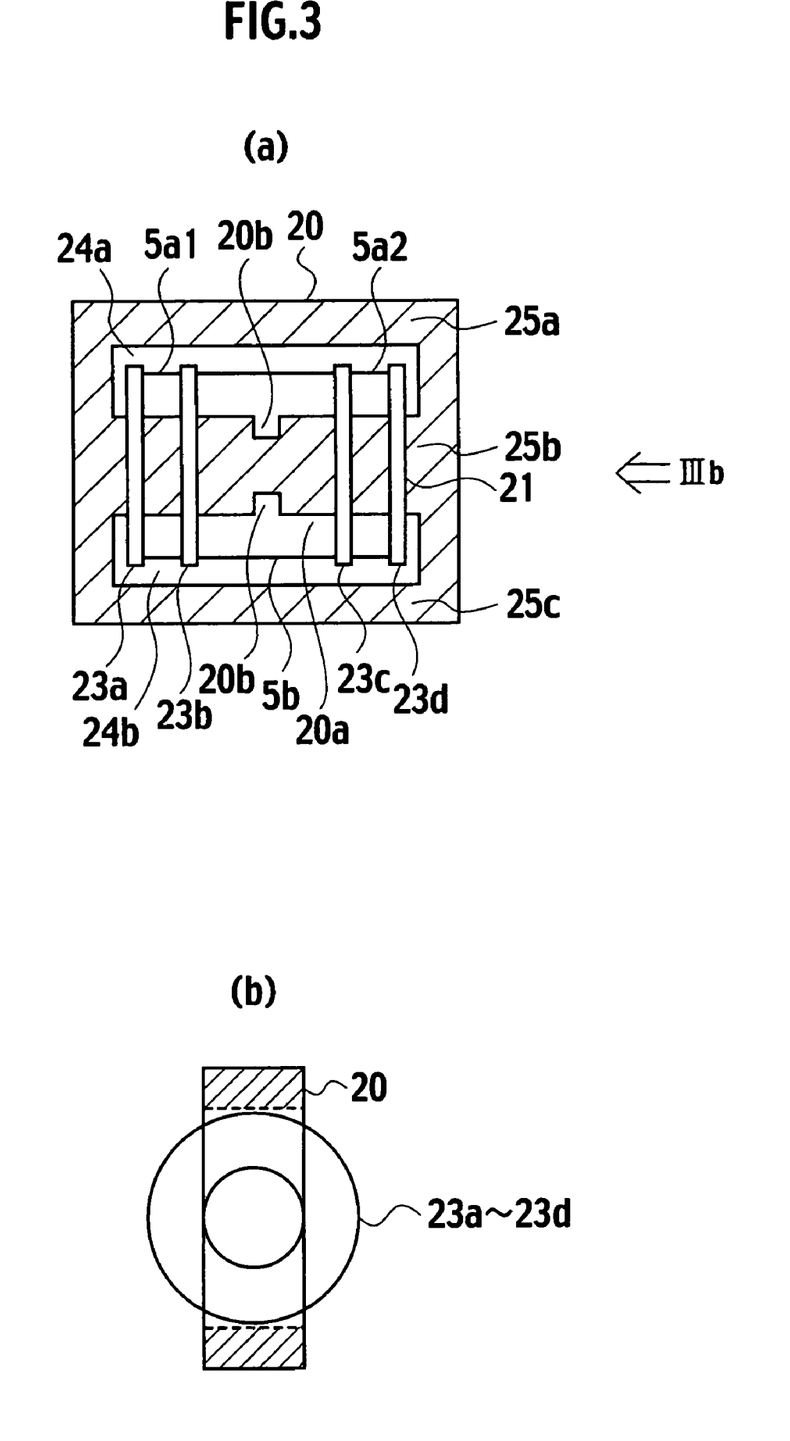
FIG. 3 is a structural view showing a transformer arranged in the switching power source apparatus of the first embodiment, in which (b) is a view of the transformer seen from IIIb of (a)

FIG. 3 is a view showing an example of the transformer arranged in the switching power source apparatus of the first embodiment, in which FIG. 3($a$) is a front sectional view showing the transformer and FIG. 3($b$) is a side sectional view showing the same. In the transformer of FIG. 3, the primary winding is divided into two sections that are connected in series, and the secondary winding is arranged between the two sections of the primary winding. The numbers of turns of the two sections of the primary winding are adjusted to adjust leakage inductance between the primary and secondary windings of the transformer.

The transformer shown in FIG. 3 has the core 20 having a rectangular external shape. The core 20 has elongate apertures 24$a$ and 24$b$ extending in parallel with each other in a longitudinal direction to form magnetic paths 25$a$, 25$b$, and 25$c$. The core 20 has a core part 20$a$ around which a bobbin is arranged. The bobbin is wound with the primary and secondary windings 5$a$ and 5$b$. The primary winding 5$a$ is divided into windings 5$a$1 and 5$a$2 that are connected in series and sandwich the secondary winding 5$b$ between them. The winding 5$a$1 of the primary winding 5$a$ is wound between flanges 23$a$ and 23$b$, the winding 5$a$2 of the primary winding 5$a$ between flanges 23$c$ and 23$d$, and the secondary winding 5$b$ between the flanges 23$b$ and 23$c$.

If the primary and secondary windings 5$a$ and 5$b$ have the same relative structure, leakage inductance between the primary and secondary windings 5$a$ and 5$b$ is generally expressed as $Lpe \propto Np^2$ where Lpe is a primary-side conversion value of the leakage inductance and Np is the number of turns of the primary winding 5$a$. Accordingly, if the number of turns Np is reduced to ½, the leakage inductance value Lpe will become ¼.

The number of turns Np is determined according to the cross-sectional area of the core 20, an input voltage, and a frequency. Accordingly, if the primary winding 5$a$ is divided into the windings 5$a$1 and 5$a$2 on the same core leg with the number of turns of each of them being ½ of that of the primary winding 5$a$ and if the windings 5$a$1 and 5$a$2 are connected in series, a transformer ratio of the transformer T will be unchanged because the number of turns of the primary winding 5$a$ is unchanged.

In this case, the primary-side-conversion leakage inductance Lpe of each of the windings 5$a$1 and 5$a$2 becomes ¼, and therefore, the windings 5$a$1 and 5$a$2 connected in series provide ½ of that of the undivided primary winding 5$a$. The number of turns of the winding 5$a$1 is Np1, that of the winding 5$a$2 is Np2, and they satisfy Np1+Np2=Np. Changing the ratio between the number of turns Np1 of the winding 5$a$1 and the number of turns Np2 of the winding 5$a$2 will provide a leakage inductance Lpc being expressed by $(Np1/Np)^2+(Np2/Np)^2$ that varies in a range between 1 and ½ wherein the leakage inductance Lpc of the undivided primary winding 5$a$ is assumed as an unit of inductance. Namely, by changing the ratio of Np1 to Np2, it is possible to adjust the leakage inductance in a range between 1 to ½ of the leakage inductance of the undivided primary winding 5$a$.

Figure 4:
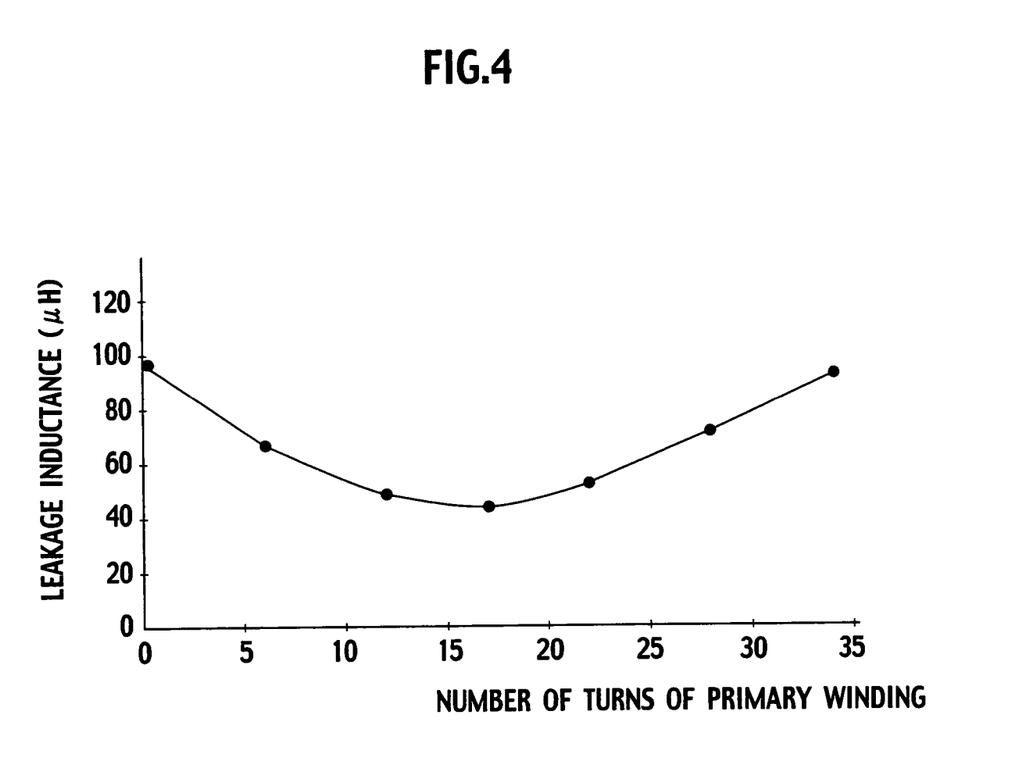
FIG. 4 is a view showing examples of measurements of leakage inductance and the number of turns of a primary winding of the transformer shown in FIG. 3.

FIG. 4 is a graph showing examples of measurements of leakage inductance and the number of turns of the primary winding of the transformer of FIG. 3. In FIG. 4, the cross-sectional area of the core 20 is 125 mm$^2$ and the number of turns of the primary winding 5$a$ is 34, which is divided into the windings 5$a$1 and 5$a$2. The leakage inductance values were measured by changing the numbers of turns of the windings 5$a$1 and 5$a$2 without changing the total (34) of turns of the windings 5$a$1 and 5$a$2. The ratio between a minimum inductance value and a maximum inductance value is ½ that conforms to the above prospect.

Under the condition that the structural positional relationship between the primary and secondary windings 5$a$ and 5$b$ is unchanged, the primary winding 5$a$ can be divided into three or more sections. In this case, the inductance is adjustable between 1 and 1/N where N is the number of divided sections of the primary winding 5$a$.

In FIG. 3, the core part 20$a$ has two recesses 20$b$. The recesses 20$b$ partly narrow the cross-sectional area of the magnetic path 25$b$ of the core 20, so that only the narrowed part may saturate, thus a core loss can be reduced.

Figure 5:
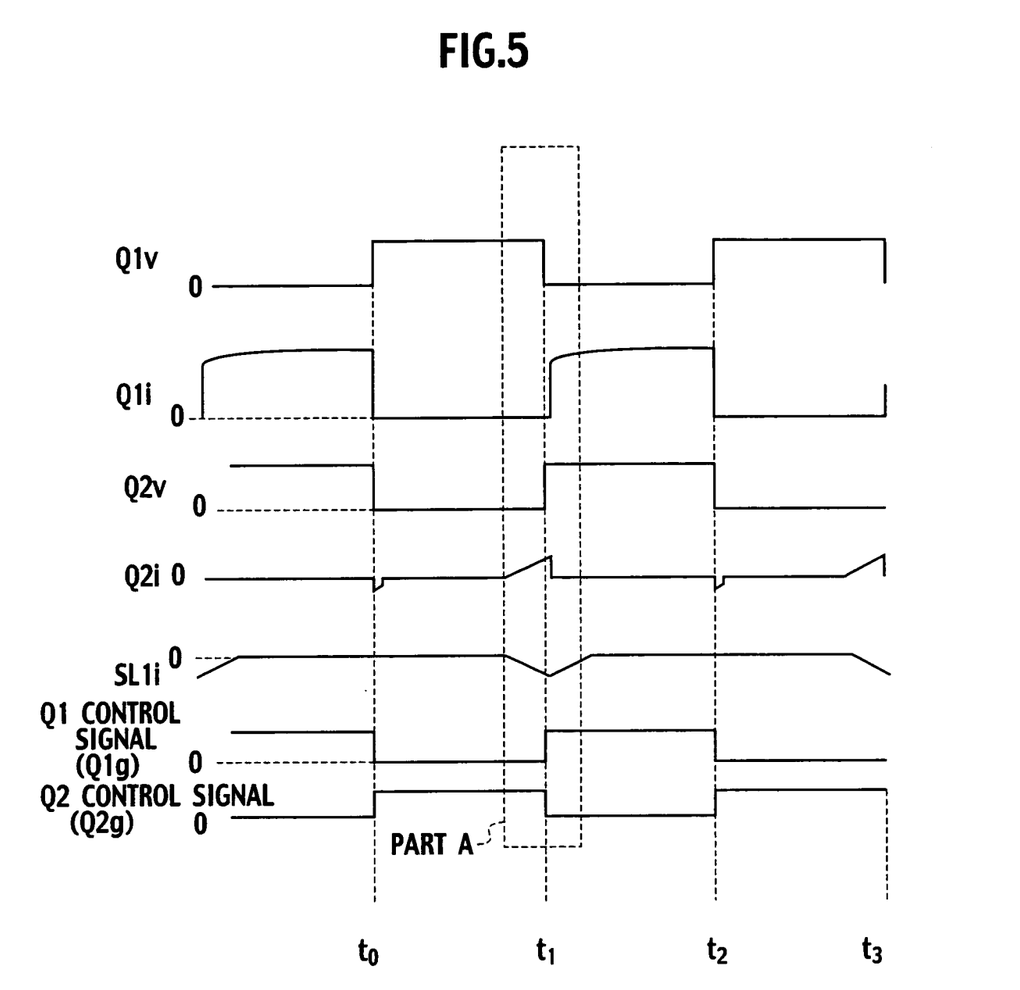
FIG. 5 is a timing chart showing signals at various parts of the switching power source apparatus of the first embodiment.
Figure 6:
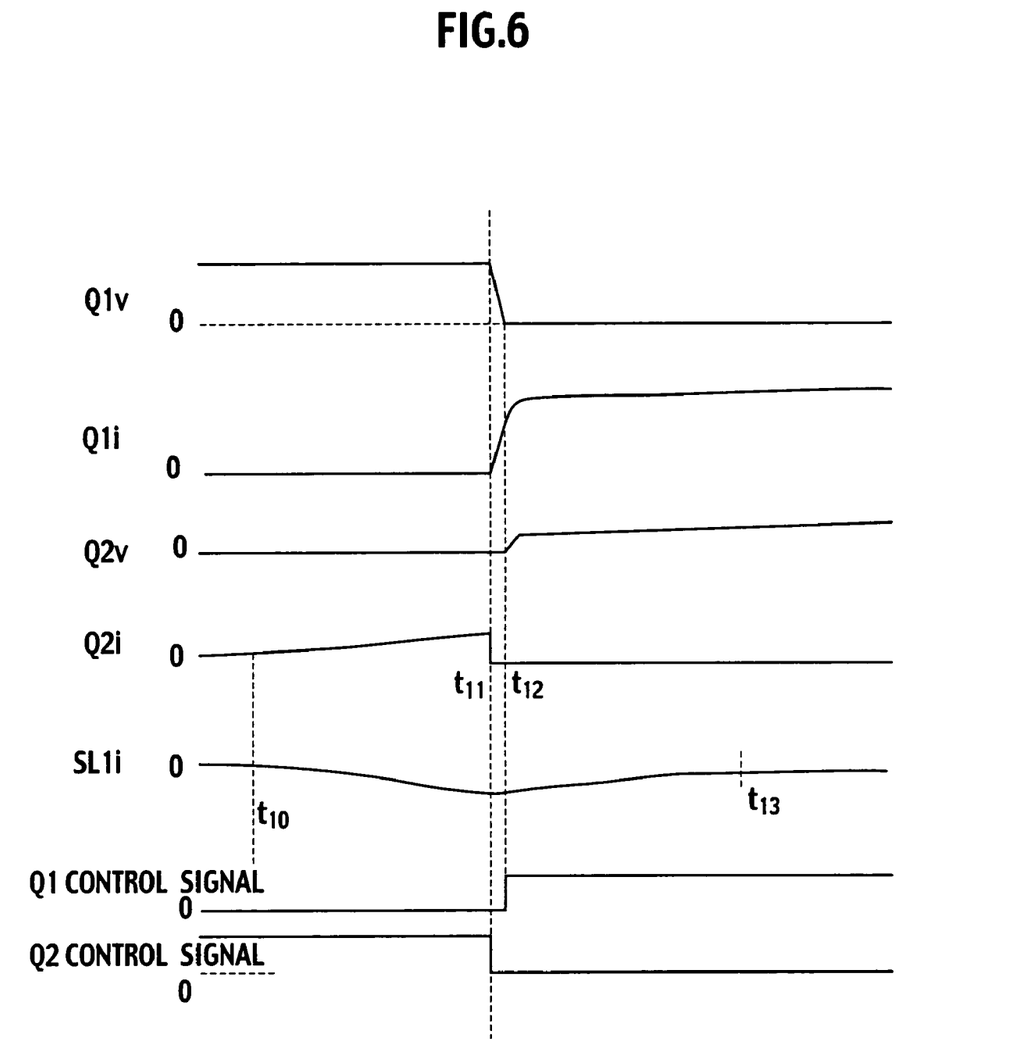
Figure 8:
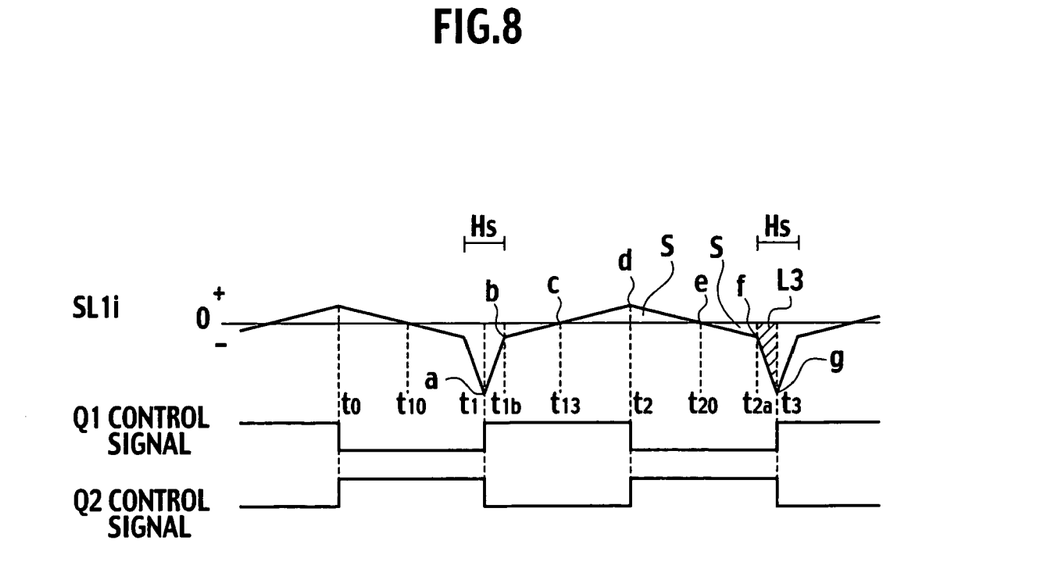
FIG. 8 is a timing chart showing a current of a saturable reactor arranged in the switching power source apparatus of the first embodiment.

Operation of the switching power source apparatus of the first embodiment with the above-mentioned structure will be explained with reference to timing charts shown in FIGS. 5, 6, and 8. FIG. 5 is a timing chart showing signals at various parts of the switching power source apparatus of the first embodiment. FIG. 6 is a timing chart showing the details of the signals at the various parts of the switching power source apparatus of the first embodiment when the switch Q1 is turned on. FIG. 7 shows a curve representing the B-H relationship of the transformer arranged in the switching power source apparatus of the first embodiment. FIG. 8 is a timing chart showing a current of the saturable reactor SL1 arranged in the switching power source apparatus of the first embodiment.

FIGS. 5 and 6 show a terminal voltage Q1$v$ of the switch Q1, a current Q1$i$ passing through the switch Q1, a terminal voltage Q2$v$ of the switch Q2, a current Q2$i$ passing through the switch Q2, and a current SL1$i$ passing through the saturable reactor SL1.

At time t1 (corresponding to time t11 to t12), the switch Q1 is turned on to pass a current through Vdc1, L3, 5$a$, Q1, and Vdc1. At this time, the secondary winding 5$b$ of the transformer T generates a voltage to pass a current through 5$b$, D1, L1, C4, and 5$b$. When the switch Q1 is turned on, a current is passed through the reactor L3 and saturable reactor SL1, to accumulate energy in the reactor L3 and saturable reactor SL1.

As show in FIG. 8, the current SL1$i$ changes to take a current value a (negative value) at time t1, a current value b (negative value) at time t1$b$, a current value c (zero) at time t13, and a current value d (positive value) at time t2. On the B-H curve shown in FIG. 7, magnetic flux changes in order of representative portions Ba, Bb, Bc, and Bd. The state portions Ba to Bg along the B-H curve shown in FIG. 7 corresponds to the time portions a to g along the time variation of SL1*i* shown in FIG. 8. An operating range ΔB of a magnetic flux is shown in FIG. 7, and the B-H curve has a saturated region Hs.

At time t2, the switch Q1 is turned off. The energy accumulated in the reactor L3 and saturable reactor SL1 charges the capacitor C1. At this time, the inductance of the saturable reactor SL1 and the capacitor C1 resonate to increase the voltage Q1*v* of the switch Q1. A current passes through L1, C4, D2, and L1 and is also supplied to the load RL through the capacitor C4.

When the potential of the capacitor C1 becomes equal to that of the clamp capacitor C3, the energy discharged from the reactor L3 and saturable reactor SL1 makes the diode D4 conductive to pass a current therethrough to charge the clamp capacitor C3. At this time, the switch Q2 is turned on to conduct a zero-voltage switching operation. From time t2 to time t20, the current SL1*i* changes from the current value d (positive value) to a current value e (zero). The magnetic flux changes from Bd to Be along the B-H curve shown in FIG. 7.

When the reactor L3 and saturable reactor SL1 terminate the discharge of energy, the charging of the clamp capacitor C3 stops.

From time t20 to time t3, the energy accumulated in the clamp capacitor C3 is flown back to the saturable reactor SL1 via C3, Q2, SL1 (5*a*), L3, and C3, to reset the magnetic flux of the saturable reactor SL1. The transformer T connected in parallel with the saturable reactor SL1 shows similar magnetic flux changes.

From time t20 to time t3, the energy accumulated in the clamp capacitor C3 is transferred back to the saturable reactor SL1, and therefore, the current SL1*i* to the saturable reactor SL1 takes negative values as shown in FIG. 8. Namely, during from time t20 to t2*a*, the current SL1*i* changes from the current value e (zero) to a current value f (negative value). The magnetic flux changes from Be to Bf along the B-H curve of FIG. 7. An area S as defined in FIG. 8 in a range from time t2 to time t20 is equal to an area S in a range from time t20 to time t2*a* as defined in the same manner. The area S corresponds to the energy of the saturable reactor SL1 accumulated in the clamp capacitor C3.

During from time t2*a* to time t3, the current SL1*i* changes from the current value f (negative value) to a current value g (negative value). The magnetic flux changes from Bf to Bg along the B-H curve of FIG. 7. An area as defined in a range from time t2*a* to time t3 corresponds to the energy of the reactor L3 accumulated in the clamp capacitor C3.

Namely, the energy accumulated in the clamp capacitor C3 is equal to the sum of one accumulated in the saturable reactor SL1 and one accumulated in the reactor L3. Accordingly, the current SL1*i* is increased at the time of resetting by the energy supplied from the reactor L3, and therefore, the state represented by magnetic flux moves to the third quadrant to reach the saturated region (Bf–Bg). As a result, the current SL1*i* increases and reaches a maximum at time t3 (also at time t1). The current SL1*i* increases just before the end of an ON period of the switch Q2 and is a saturation current of the saturable reactor SL1.

At time t3, the current Q2*i* of the switch Q2 reaches a maximum. At this time, the switch Q2 is turned off to steeply discharge the capacitor C1 to zero. At this time, the switch Q1 is turned on to conduct a zero-voltage switching operation.

The saturation current is determined by the energy supplied from the reactor L3 to the clamp capacitor C3. If the load is constant, a current value is constant, and therefore, the saturation current is proportional to the inductance of the reactor L3. If the saturation current is small, the voltage of the switch Q1 is not zeroed, and therefore, the switch Q1 is unable to conduct the ZVS operation.

If the saturation current is large, a circulation current increases to increase a loss. In such a case, the inductance of the reactor L3 should be properly set. The reactor L3 is connected in series with the primary winding 5*a* of the transformer T. As shown in FIG. 4, the primary winding 5*a* of the transformer is divided into the two windings 5*a*1 and 5*a*2, and the numbers of turns of the windings 5*a*1 and 5*a*2 are adjusted to properly set the leakage inductance between the primary and secondary windings of the transformer T. Thus an external reactor is not necessary and a proper inductance between the primary and secondary windings is provided, thereby a proper zero-voltage switching operation is realized. At the same time, capacitance between the primary and secondary windings of the transformer T is reduced, to increase the efficiency of the switching power source apparatus, lower the noise thereof, decrease the cost thereof, and simplify the circuitry thereof.

Second Embodiment

Figure 9:
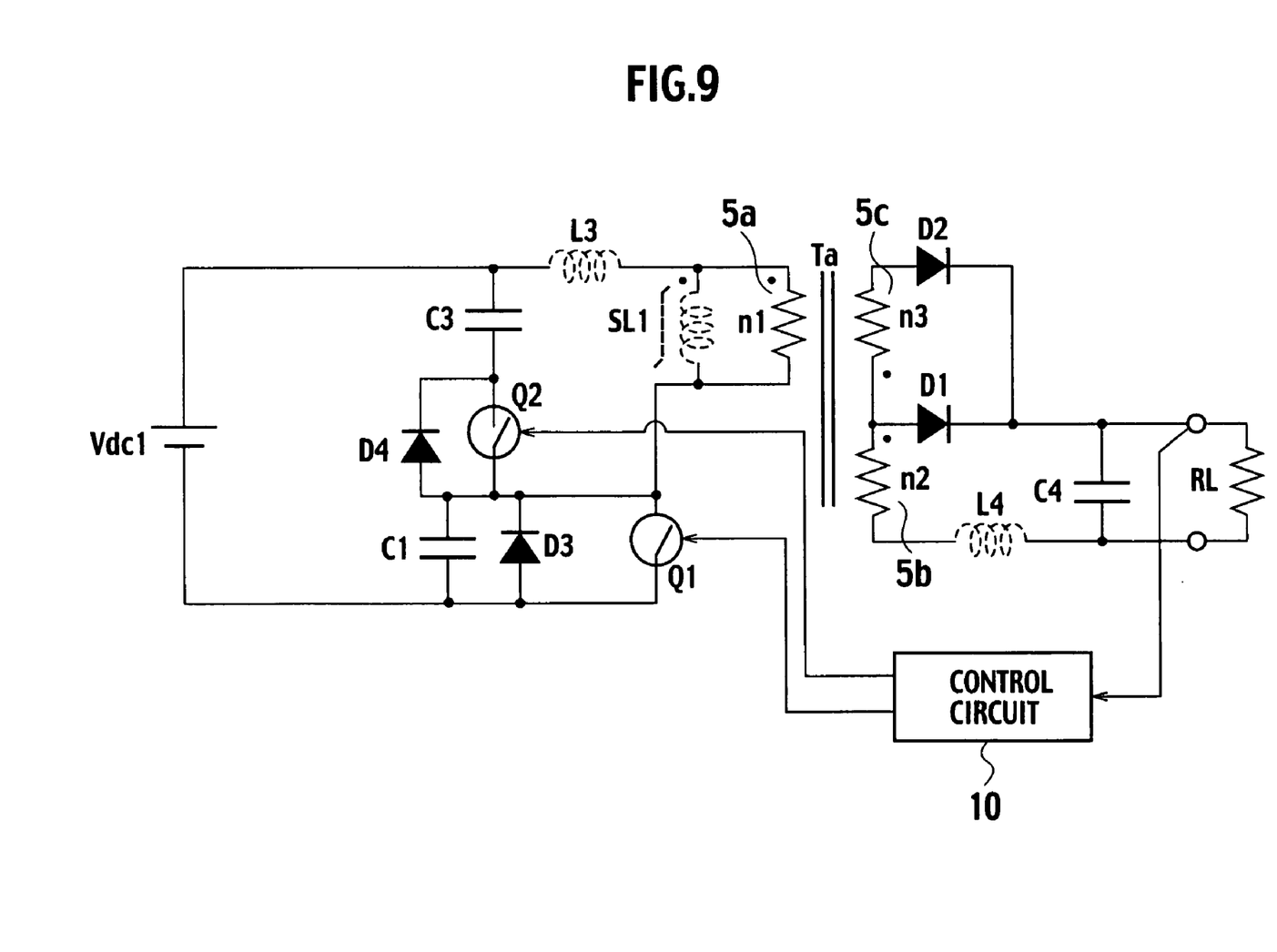
FIG. 9 is a circuit diagram showing a switching power source apparatus according to an second embodiment.

A switching power source apparatus according to the second embodiment of the present invention will be explained. FIG. 9 is a circuit diagram showing the switching power source apparatus of the second embodiment. The switching power source apparatus of the second embodiment shown in FIG. 9 differs from the switching power source apparatus of the first embodiment shown in FIG. 2 in a circuit on the secondary side of a transformer Ta. Accordingly, only the different part will be explained.

The transformer Ta has a primary winding 5*a* having the number of turns of n1, a secondary winding having the number of turns of n2, and a tertiary winding 5*c* having the number of turns of n3.

The secondary winding 5*b* and tertiary winding 5*c* of the transformer Ta form a series circuit in which both ends are connected to a series circuit having a diode D2 and a smoothing capacitor C4. A node between the secondary winding 5*b* and the tertiary winding 5*c* and a node between the diode D2 and the smoothing capacitor C4 are connected to a diode D1. The primary and secondary windings 5*a* and 5*b* are in-phase, and the primary and tertiary windings 5*a* and 5*c* are in opposite phases.

The secondary winding 5*b* of the transformer Ta is loosely coupled with the primary winding 5*a*, and leakage inductance existing between the primary and secondary windings 5*a* and 5*b* substitutes for a reactor L1 connected in series with the smoothing capacitor C4. The tertiary winding 5*c* of the transformer Ta is slightly loosely coupled with the primary winding 5*a*, and leakage inductance between the primary and tertiary windings 5*a* and 5*c* substitutes for a reactor L3 connected in series with the transformer Ta.

Operation of the switching power source apparatus of the second embodiment with the above-mentioned structure will be explained. The operation is basically the same as that of the first embodiment, and therefore, operation of the second embodiment on the secondary side of the transformer Ta will be mainly explained.

A switch Q1 is turned on to pass a current through Vdc1, L3, 5*a*, Q1, and Vdc1. At this time, the secondary winding 5*b* of the transformer Ta generates a voltage to pass a current through 5*b*, D1, C4, L4, and 5*b*. As a result, a current of the diode D1 linearly increases.

Then, the switch Q1 is turned off. Energy accumulated in the leakage inductance L4 between the primary and secondary windings 5*a* and 5*b* of the transformer Ta is returned back to the secondary side through the transformer Ta. On the secondary side, the tertiary winding 5c of the transformer Ta induces a voltage to pass a current through 5c, D2, C4, L4, 5b, and 5c in order. This results in passing a current to the diode D2.

In this way, the leakage inductance L4 between the primary and secondary windings 5a and 5b of the transformer Ta is increased to return energy accumulated during an ON period of the switch Q1 to the secondary side through the transformer Ta. This results in improving efficiency. The diodes D1 and D2 continuously pass a secondary current during ON and OFF periods of the switch Q1, to reduce a ripple current of the smoothing capacitor C4.

Figure 10:
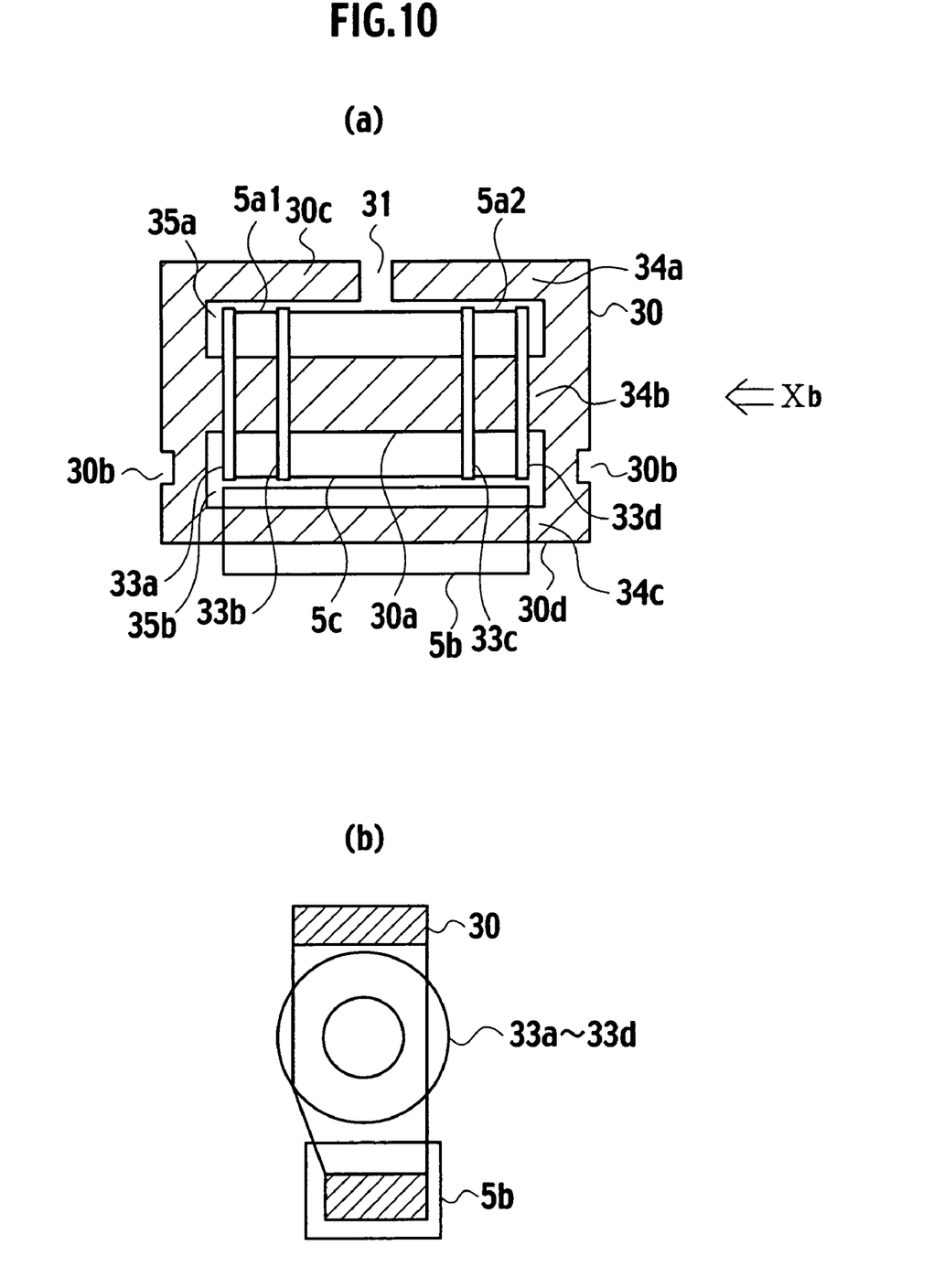
FIG. 10 is a structural view showing a transformer arranged in the switching power source apparatus of the second embodiment, in which (b) is a view of the transformer seen from Xb of (a).

FIG. 10 is a structural view showing the transformer arranged in the switching power source apparatus of the second embodiment, in which FIG. 10(a) is a front sectional view showing the transformer and FIG. 10(b) is a side sectional view showing the same. The transformer Ta shown in FIG. 10 has a core 30 having a rectangular external shape. The core 30 has elongate apertures 35a and 35b extending in parallel with each other in a longitudinal direction to form magnetic paths 34a, 34b, and 34c. The core 30 has a core part 30a around which a bobbin is arranged. The bobbin is wound with the primary winding 5a that is divided into windings 5a1 and 5a2, and the tertiary winding 5c that is sandwiched between the windings 5a1 and 5a2. The winding 5a1 of the primary winding 5a is wound between flanges 33a and 33b, the winding 5a2 of the primary winding 5a between flanges 33c and 33d, and the tertiary winding 5c between the flanges 33b and 33c. This arrangement forms slight leakage inductance between the primary and tertiary windings.

The core 30 has a gap 31, and a peripheral core 30d is wound with the secondary winding 5b. The primary and secondary windings 5a and 5b are loosely coupled due to the gap 31, thereby leakage inductance is increased.

The core 30 of the transformer Ta is wound with the primary and secondary windings 5a and 5b to provide the leakage inductance L4 and wound with the primary and tertiary windings 5a and 5c to provide the leakage inductance L3 that is smaller than the leakage inductance L4 of the primary and secondary windings 5a and 5b.

Two recesses 30b are formed on the peripheral core and between the primary and secondary windings 5a and 5b. The recesses 30b partly narrow the cross-sectional area of the magnetic path of the peripheral core, so that only the narrowed part may easily saturate. This configuration lowers a core loss.

The characteristic shape of the core and the characteristic windings of the transformer Ta are effective to reduce the size and cost of the switching power source apparatus of the second embodiment. In addition, the second embodiment can provide the same effects as the first embodiment.

In summary, the switching power source apparatus according to the present invention forms a first reactor with leakage inductance between the primary and secondary windings of a transformer. The primary winding of the transformer is divided into two sections that are connected in series. The secondary winding of the transformer is arranged between the two divided sections of the primary winding. The numbers of turns of the two divided sections of the primary winding are adjusted to adjust the leakage inductance between the primary and secondary windings of the transformer. This configuration eliminates the need of an external reactor and optimizes the inductance between the primary and secondary windings of the transformer, to realize a proper zero-voltage switching operation. The switching power source apparatus of the present invention, therefore, is highly efficient, is low in noise, and is manufacturable at low cost.

INDUSTRIAL APPLICABILITY

The present invention is applicable to switching power source apparatuses such as DC-DC converters and AC-DC converters.

The invention claimed is:

1. A switching power source apparatus comprising:
a first series circuit being connected to both ends of a DC power source and having a first reactor, a primary winding of a transformer, and a main switch that are connected in series;
a second series circuit being connected to both ends of the main switch or both ends of the primary winding and having an auxiliary switch and a clamp capacitor that are connected in series;
a saturable reactor being connected in parallel with the primary winding of the transformer;
a rectifying-smoothing circuit configured to rectify and smooth a voltage generated on a secondary winding of the transformer; and
a control circuit configured to alternately turn on/off the main and auxiliary switches and to turn off the auxiliary switch as a current of the auxiliary switch increases due to saturation of the saturable reactor, wherein
the first reactor has a leakage inductance being formed between the primary and secondary windings of the transformer, and
the primary winding is divided into two sections that are connected in series, the secondary winding is arranged between the two sections of the primary winding, and the numbers of turns of the two sections of the primary winding is adjusted to adjust the leakage inductance between the primary and secondary windings of the transformer.

2. The switching power source apparatus according to claim 1, wherein the saturable reactor is formed based on the saturation characteristic of a core of the transformer.

3. The switching power source apparatus according to claim 1, wherein
the cross-sectional area of a magnetic path of the core of the transformer is partly reduced so that this portion of the magnetic path of the core of the transformer is saturated with energy accumulated in the leakage inductance being formed between the primary and secondary windings of the transformer, to thereby make the main switch conduct a zero-voltage switching operation.

4. The switching power source apparatus according to claim 2, wherein
the cross-sectional area of a magnetic path of the core of the transformer is partly reduced so that this portion of the magnetic path of the core of the transformer is saturated with energy accumulated in the leakage inductance being formed between the primary and secondary windings of the transformer, to thereby make the main switch conduct a zero-voltage switching operation.

5. The switching power source apparatus according to claim 1, wherein
in a case where the control circuit turns on the main switch, the main switch is turned on within a predetermined period after the voltage of the main switch is zeroed due to resonance between a capacitor connected in parallel with the main switch and saturated inductance of the saturable reactor.

6. The switching power source apparatus according to claim 4, wherein
in a case where the control circuit turns on the main switch, the main switch is turned on within a predetermined period after the voltage of the main switch is zeroed due to resonance between a capacitor connected in parallel with the main switch and saturated inductance of the saturable reactor.

7. The switching power source apparatus according to claim 1, wherein
the rectifying-smoothing circuit is formed with a first rectifying element being connected in series with the secondary winding of the transformer,
a second rectifying element being connected in parallel with the series circuit having the first rectifying element and secondary winding, and
a smoothing element being connected in parallel with the second rectifying element through a second reactor.

8. The switching power source apparatus according to claim 6, wherein
the rectifying-smoothing circuit is formed with a first rectifying element being connected in series with the secondary winding of the transformer,
a second rectifying element being connected in parallel with the series circuit having the first rectifying element and secondary winding, and
a smoothing element being connected in parallel with the second rectifying element through a second reactor.

9. The switching power source apparatus according to claim 1, wherein
the rectifying-smoothing circuit is formed with a third series circuit having the secondary winding and a tertiary winding of the transformer,
a fourth series circuit being connected to both ends of the third series circuit and having a first rectifying element and a smoothing element, and
a second rectifying element being connected to a node between the secondary and tertiary windings and a node between the first rectifying element and the smoothing element.

10. The switching power source apparatus according to claim 6, wherein
the rectifying-smoothing circuit is formed with a third series circuit having the secondary winding and a tertiary winding of the transformer;
a fourth series circuit being connected to both ends of the third series circuit and having a first rectifying element and a smoothing element; and
a second rectifying element being connected to a node between the secondary and tertiary windings and a node between the first rectifying element and the smoothing element.

11. The switching power source apparatus according to claim 9, wherein:
the primary and secondary windings are wound around the core of the transformer to provide leakage inductance; and
the primary and tertiary windings of the transformer are wound to provide leakage inductance that is smaller than that provided by the primary and secondary windings.

12. The switching power source apparatus according to claim 10, wherein:
the primary and secondary windings are wound around the core of the transformer to provide leakage inductance; and
the primary and tertiary windings of the transformer are wound to provide leakage inductance that is smaller than that provided by the primary and secondary windings.

* * * * *